United States Patent
Hu et al.

(10) Patent No.: US 11,150,918 B2
(45) Date of Patent: Oct. 19, 2021

(54) METHOD AND APPARATUS FOR USER-DESIGNATED APPLICATION PRIORITIZATION

(71) Applicant: FORD GLOBAL TECHNOLOGIES, LLC, Dearborn, MI (US)

(72) Inventors: Jeffrey Yizhou Hu, Ann Arbor, MI (US); Michael Crimando, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 132 days.

(21) Appl. No.: 15/710,168

(22) Filed: Sep. 20, 2017

(65) Prior Publication Data

US 2019/0087203 A1    Mar. 21, 2019

(51) Int. Cl.
| | |
|---|---|
| *G06F 9/451* | (2018.01) |
| *G06F 21/62* | (2013.01) |
| *G06F 9/48* | (2006.01) |
| *G06F 21/44* | (2013.01) |
| *G06N 5/02* | (2006.01) |

(52) U.S. Cl.
CPC .......... *G06F 9/451* (2018.02); *G06F 9/4881* (2013.01); *G06F 21/44* (2013.01); *G06F 21/629* (2013.01); *G06N 5/02* (2013.01); *B60K 2370/11* (2019.05); *B60K 2370/1868* (2019.05); *B60K 2370/55* (2019.05); *B60K 2370/589* (2019.05)

(58) Field of Classification Search
CPC ........ G06F 9/451; G06F 9/4881; G06F 21/44; G06N 5/02
See application file for complete search history.

(56) References Cited

U.S. PATENT DOCUMENTS

| | | | |
|---|---|---|---|
| 9,128,757 B2 | 9/2015 | Wang | |
| 9,514,406 B2 | 12/2016 | Boyer | |
| 2004/0193524 A1* | 9/2004 | Almeida | G06Q 40/04 705/36 R |
| 2013/0014040 A1* | 1/2013 | Jagannathan | G06Q 50/01 715/765 |
| 2016/0070427 A1* | 3/2016 | Furtwangler | G06F 40/154 715/762 |
| 2016/0159218 A1* | 6/2016 | Kang | B60K 35/00 701/36 |
| 2017/0336920 A1* | 11/2017 | Chan | G06Q 10/10 |

OTHER PUBLICATIONS

NPL-15710168 (Year: 2020).*

* cited by examiner

*Primary Examiner* — Angie Badawi
(74) *Attorney, Agent, or Firm* — Michael Spenner; Brooks Kushman P.C.

(57) ABSTRACT

A system includes a processor configured to determine a set of context-variable values, responsive to a restriction imposition resulting in a limited-display capability for displaying selectable application icons. The processor is also configured to determine a correlation between the context-variable values and context states saved for each of a plurality of applications displayable as selectable application icons and display a predefined number of the plurality of selectable application icons corresponding to the applications having the highest correlation with the context-variable values.

15 Claims, 4 Drawing Sheets

METHOD AND APPARATUS FOR USER-DESIGNATED APPLICATION PRIORITIZATION

TECHNICAL FIELD

The illustrative embodiments generally relate to methods and apparatuses for user-designated application prioritization.

BACKGROUND

Vehicle technology is advancing at an accelerated rate, providing connectivity options and application utilization capabilities within a vehicle experience. Similar to a display on a tablet or smart phone, drivers and occupants can view and access lists of applications installed in a vehicle, or available to a vehicle through a connection with a server or a smart-phone or other portable device. And, just as a display on a tablet or smart-phone, addition of numerous applications can result in pages and pages of displayed application options.

While multiple screens of applications may not present a particular problem on a smart-phone, in a vehicle environment it can be difficult for a driver to parse numerous pages of applications, especially while a vehicle is in motion. While many applications have driving-related utility, the public has a vested interest in drivers not scrolling through page after page of applications while the driver should be focused on the road.

SUMMARY

In a first illustrative embodiment, a system includes a processor configured to determine a set of context-variable values, responsive to a restriction imposition resulting in a limited-display capability for displaying selectable application icons. The processor is also configured to determine a correlation between the context-variable values and context states saved for each of a plurality of applications displayable as selectable application icons and display a predefined number of the plurality of selectable application icons corresponding to the applications having the highest correlation with the context-variable values.

In a second illustrative embodiment, a system includes a processor configured to modify a displayed set of selectable application icons, responsive to imposition of a maximum number of icons restriction, wherein the modified displayed set includes application icons corresponding to applications having context values associated therewith that more closely correspond to vehicle-measured context-variable values than context values associated with applications for which selectable icons are not displayed.

In a third illustrative embodiment, a computer-implemented method includes limiting a total number of displayed application icons based on a vehicle-instructed restriction imposition. The method also includes selecting, from a plurality of applications more than the total number, the total number of applications for which icons are to be displayed, based on the selected applications having the highest correlation between saved application context values and current context as determined by a vehicle computer and displaying selectable icons for the selected total number of applications.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
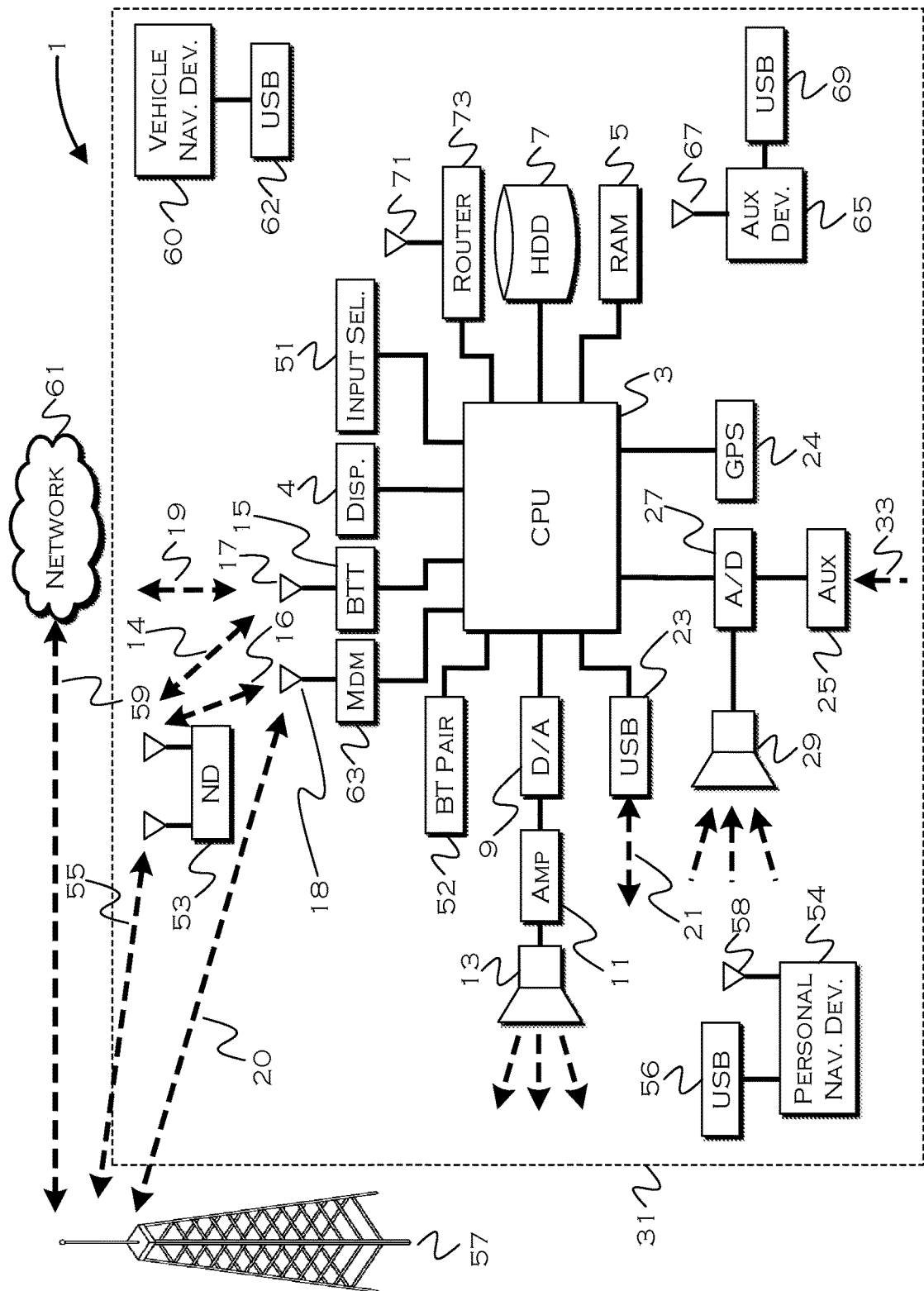
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in Figure 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLU-ETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a Wi-Fi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11 g network (i.e., Wi-Fi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While the driving experience is often improved and enhanced by the use of vehicle-based applications, it can be difficult for a driver to navigate through pages of applications to find an application-of-interest while the driver is driving. In a manner similar to how certain input features are locked when driving, automotive OEMs may address this situation by locking the number of viewable pages while a vehicle is under speed.

If an original application ordering were preserved, this could result in drivers not being able to access new applications, which would typically get added to a last-page of a series. While the driver might be able to manually re-order lists of applications, it is uncommon for drivers to spend a large degree of time interacting with vehicle displays while simply sitting around. That is, while it may be convenient to re-order applications on a smart-phone, people may find it much less convenient to do so on a vehicle display.

The illustrative embodiments provide an option to associate user-priorities with certain applications. When a vehicle restricts display of applications to a limited number of pages (e.g., 1 or 2), the system can re-order the application icons to reflect the user preferences, putting the preferred applications on the several available pages. The re-ordered applications could have fixed locations, or could be organized alphabetically or by a ranking order. In one example, once an application has a "spot" on a preferred page, it retains that spot until the application is removed from the preferred list (e.g., replaced by a new application). The new application would then receive the old spot, and this keeps the applications in a regular order so that a driving user knows where to expect a particular application to be located. When a vehicle slows, the process may revert the accessible list of applications to the previously ordered pages.

Because of the automatic re-ordering when the vehicle limits access, people can simply add desirable applications and designate those applications as preferred applications. This avoids having to manually re-order applications, and instead allows the vehicle to present the relevant applications when application access is limited. This should increase the frequency with which drivers are able to use newly added and desirable applications, without requiring the driver to manually re-order the application displays when a new application is added. This also allows less technically savvy people, who otherwise might not be able to manually re-order displayed applications, to enjoy the benefit of newly added applications while driving.

Figure 2:
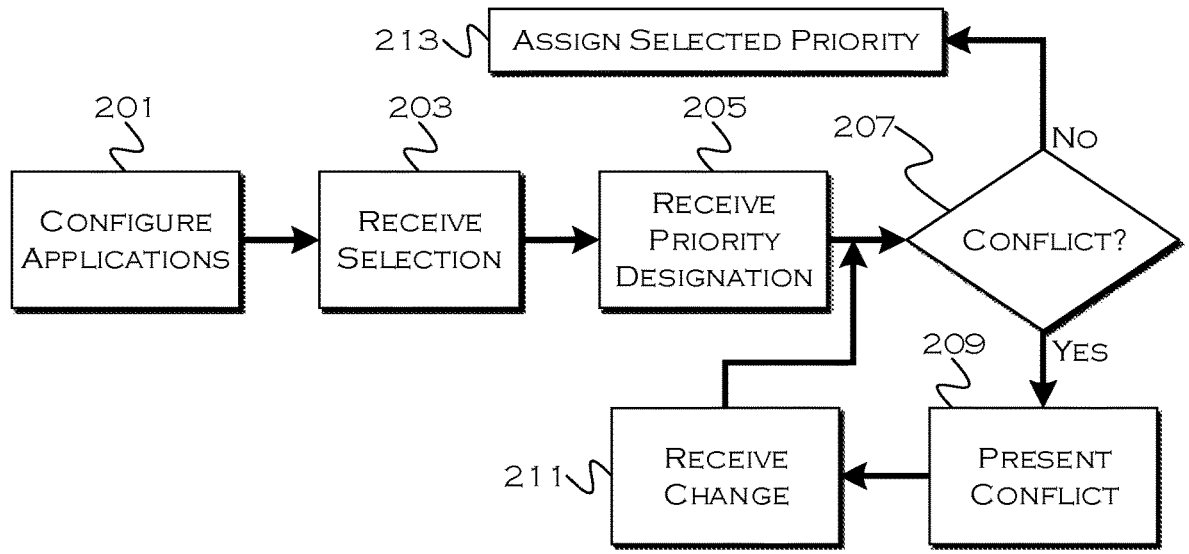
FIG. 2 shows an illustrative process for priority configuration.

FIG. 2 shows an illustrative process for priority configuration. In this example, the process receives 201 a command to begin configuration of application priorities. This process could be run individually with respect to a particular application, or could be run to initially prioritize a batch of applications. In other examples, a new application may have a priority designator (such as a selectable star) and the conflicts portion of this process could be engaged if the priority designator were selected.

There are several possible ways to provide priority of applications. In a binary system, a vehicle may display 1-2 pages of applications when the vehicle is moving, and any number of pages when the vehicle is at rest. In this sort of system, the vehicle would move the prioritized applications to the displayed pages while the vehicle is moving, and revert (if desired) to the original ordering when the vehicle was at rest.

In another possible methodology, the vehicle may limit the number of displayed pages based on a level of driver distraction. For example, if the level of distraction was low, the vehicle may allow access to 3 pages of applications, and as the level of distraction rises, the number of pages and/or number of applications per page may lower. In this example, applications may have an ordered priority associated therewith, and may be presented in order of the priority based on how many applications and/or pages were accessible. The methodologies and techniques herein lend themselves to both and similar types of systems, and are not restricted to any particular version of how application display is prioritized or limited.

In the process shown in FIG. 2, the system receives 203 selection of an application to be prioritized. In batch processing, this could be a selection of multiple "priority" applications, or a re-ordering of application rankings in an ordered priority list. In one-off processing, this could be selection of a priority icon associated with an application.

Whether the priority is "binary" or ordered, the process receives 205 a designation of priority based on user preference. Since there is a limited space for priority applications, the process may identify 207 any possible conflicts based on the indicated priority. For example, in the binary system, there may be a total of sixteen spaces (eight per page) for application display. If seventeen applications are selected as "priority," then the process may realize that this is more applications than could be displayed on the two accessible pages.

In the ranked process, the system may realize that two applications have been given the same priority ranking. This may be ok if a high-medium-low schema is used (up to a maximum for each tier), but similar conflicts could be identified as described above. Essentially, a conflict exists when user designations would cause more than an allowable number of prioritized applications to be attempted to be displayed (resulting in non-display of at least one priority application).

The process presents 209 any identified conflicts for user resolution, and receives 211 a user-designated change. Presentation of a particular conflict can inform the user which applications may not be displayed, and/or can allow a user to de-prioritize or change priority of at least one application to resolve the conflict. This can also include instructions as to what needs to be done in order to resolve the conflict, so as to avoid user confusion. Once any conflicts have been resolved, the process assigns 213 the designated priority.

Figure 3:
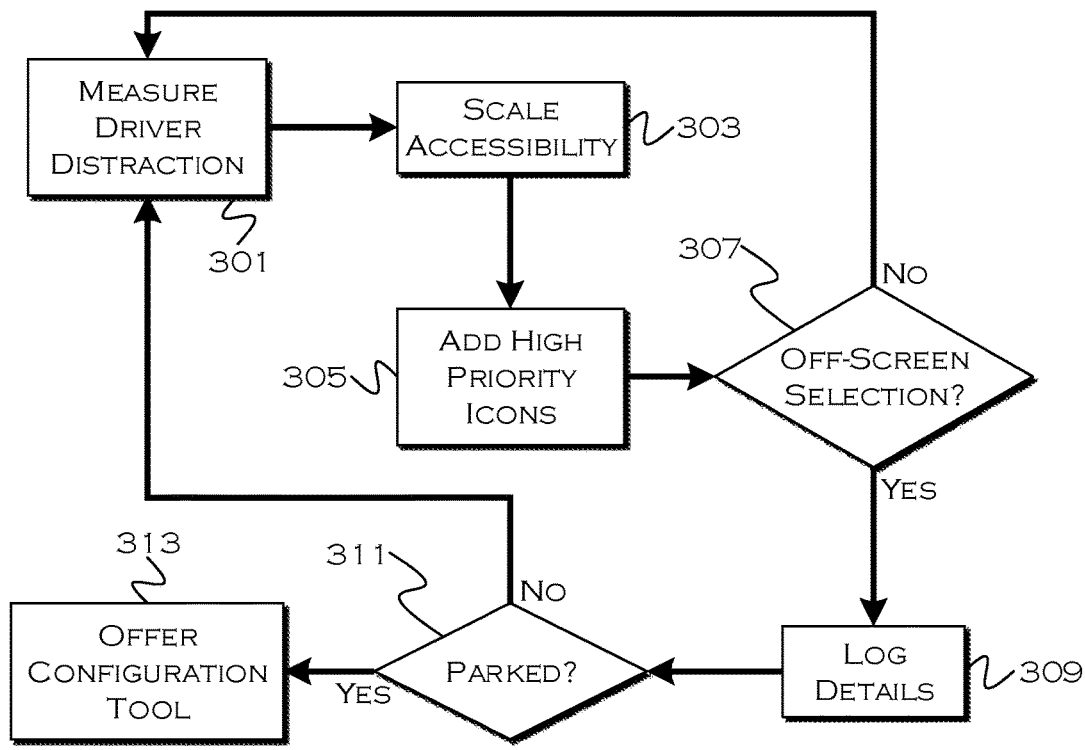
FIG. 3 shows an illustrative process for access provision.

FIG. 3 shows an illustrative process for access provision. As previously noted, in the binary type system a fixed number of pages (e.g., two pages) may be displayed when a vehicle is in motion. In this example, however, the process may dynamically adjust both the number of pages and number of applications per page, based on driver distraction levels. For example, in the lowest level of distraction, while a vehicle is moving, the driver may be able to access two pages and eight applications per page. A higher level of distraction (heavy traffic, rain, etc.) could result in, for example, a single page or four icons per page. A higher level of distraction than that (e.g., heavy traffic and rain) could result in a single page with only four applications. In such instances, some form of ordering would be needed to organize which priority applications were displayed. This ordering could be based on user-designated denotations or could be based on, for example, observed usage (with more-frequently-utilized applications being given higher priority within the priority applications).

In this example, the process measures 301 a driver distraction level based on a variety of factors known in the art. This can include, for example, the mere fact a vehicle is moving, a measured or determined localized traffic level (locally determinable or obtained from a server), a measured or determined severity or type of localized weather (e.g., light rain, heavy rain, snow, etc.) or any other reasonable constraints. Even a number of passengers and/or conversation level inside a vehicle can be a basis as a gauge of driver distraction.

Based on a tiered level of distraction (e.g., low, medium, high) the process then scales 303 an accessibility factor for available applications. As previously noted, this could be, for example, limiting accessible pages, decreasing a number of applications per page (which could also result in increasing application icon size for easy access), etc. Based on a current accessibility setting (e.g., two pages, four icons per page), the process then adds 305 the appropriate number of priority application icons. This tailoring can be an ongoing process based on a driver distraction level (e.g., at a later point in the drive, more or fewer pages and icons could be available).

Since the user may want an application that is not currently displayed on the set of available pages, the process may detect 307 if a user tries to scroll past the currently available set. While the process would prevent access to other icons, such an action would indicate that an unavailable application was desired under the current situation. This may be an opportunity to improve priority ranking, and thus the process could log 309 the attempt to scroll past the icons, along with any relevant accessibility parameters (e.g., which applications were accessible, what the level of distraction and maximum number of applications were, etc).

Once the vehicle is parked 311, the process could offer a configuration tool that would allow the user to re-prioritize the applications in order to better reflect an actual user preference.

Also, as previously noted, original application ordering can be preserved, and the process can revert to the original priority when the accessibility state changes. And, as previously noted, various applications can consistently be placed in the same spot in varied priority states, which avoids having the user to have to hunt for a desired application when priority levels change. Applications of new priority designation can simply be placed in a spot where the previous application, that is now de-prioritized, existed.

Figure 4:
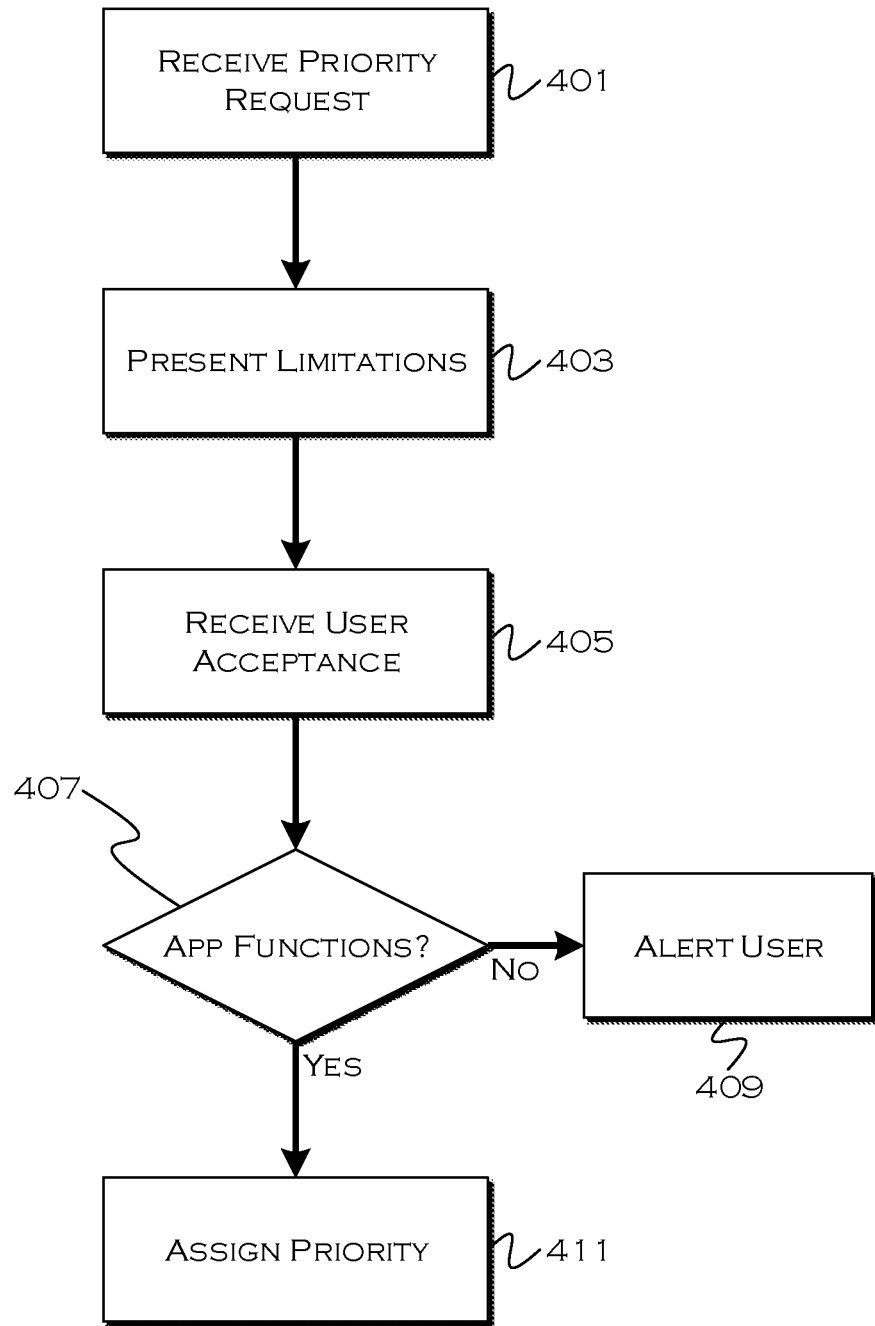
FIG. 4 shows an illustrative process for application priority tailoring.

FIG. 4 shows an illustrative process for application priority tailoring. In this example, certain applications may have limited functionality when a vehicle is under speed. That is, even if the application is accessible, inputs, outputs, etc. may be limited based on levels of driver distraction, safety concerns or government regulations. Accordingly, the prioritization process alerts a user to these constraints when priority is selected, so that the user, who has limited available priority choices, can determine if the application so-limited is still a desirable priority application.

In this example, the process receives 401 a priority request to assign some form of priority to a particular application. Also, in this example, the chosen application has some limitations applied based on speed or driver distraction, which could be, for the sake of example only, limiting input to 20 characters per minute. The process presents 403 any associated limitations that would attach to the application, and the user confirms 405 that the limitations are acceptable.

Also, in this example, certain application aspects or functions may be completely disabled based on certain speed or distraction parameters. If the applications has such functions (e.g., video display may be disabled) 407, the process could warn 409 the user that the application may lose significant functionality. Since both developers and OEMs may know which functions are disabled during use, the developer could designate a list of "critical" functions in the code, and the OEM process could scan the "critical" functions to determine if any core functionality would be lost based on restrictions. This would prevent the user from prioritizing an unusable application (unusable under speed) and annoying the user when the application failed to function when selected while driving. If no core functionality will be lost, the process can assign 411 the prioritization.

While user-ordering or ordering based on commonality of usage is one model to determine which applications a system presents to a user, it may be the case that a user either uses many applications frequently (causing more "preferred" applications than will fit on a permissible number of display screens) or, for example, uses some applications very regularly under certain circumstances, but not regularly enough to show up on limited display space when the parameters for presentation are based solely on aggregate usage.

The same solution can be used to accommodate both the "too many apps" scenario and the "situational apps" scenario. By using some level of context associated with one or more applications, the situational relevance of a particular application can be considered when determining which applications to display. This can help sort out which of twenty frequently used apps to display when only eight apps can be displayed, and can help select an app for inclusion in the eight that is preferred in a given situation, but is only the $40^{th}$ most-frequently-used application.

In the simplest sense, context can be understood as a recurring circumstance or set of circumstances under which usage was previously observed. For example, if a user was on a diet, but got one "cheat meal" each week, and chose to eat pizza every Friday for lunch, the user may, only between 11 AM and 1 PM on Friday, always use a pizza-ordering application. Since this application is only used once per week at most, and always in a limited time window, the total usage rate for this application might be low. But, between the hours of 11 AM and 1 PM on Friday, this might be the most commonly used application. By accommodating and considering context related to applications, the vehicle can achieve a somewhat dynamic display of applications, when application display is restricted to limited icons, and prevent a user from having to, for example, stop a vehicle in order to unlock an entire set of possible applications.

The display itself can be purely based on usage, purely based on context (or other suitable sorting paradigms) or be a blended display of both (i.e., the first four of eight applications are the most commonly used regardless of context, and the next four are the most commonly used under the current observed context.

The variables considered for context can be virtually limitless in scope, based on what a manufacturer is attempting to accommodate. They can include, but are not limited to, speed, weather, time of day, day of week, number of occupants, current location (or locality), trip-start/end location, current radio selection, vehicle characteristics, etc. A manufacturer could even provide a somewhat exhaustive list of observable context, and an occupant could define which contexts the process should or should not consider. For example, someone who is a person of routine might find it very appropriate to have a system consider time of day and day of week, but a person who is more "spur of the moment" might prefer that the system consider location (e.g., if I'm near my favorite restaurant, I may go there) as opposed to timing (I always eat the same thing each Friday for lunch).

Observing application usage and associated context for even a limited period of time for a given user can help provide a new hierarchy of sorting. Observing the usage over a prolonged period of time can help refine the sorting and introduce new context variables to make the presented applications even more accurate.

Figure 5:
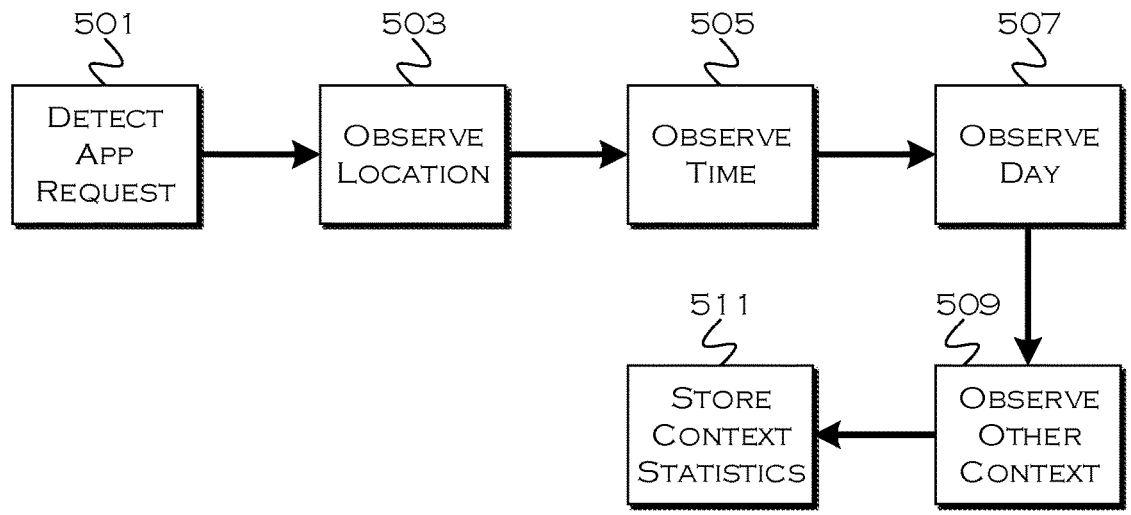
FIG. 5 shows an illustrative process for application context association.

FIG. 5 shows an illustrative process for application context association. In this illustrative example, the process detects 501 a request for an application usage. If certain applications are set to automatically trigger under certain conditions, that could also be detected. If the desire is to order user-requested applications over triggered applications, then the process can distinguish between the two types, and may, for example, give a higher weight to a user-triggered application.

In this example, several non-limiting examples of context are tracked by the process, to demonstrate the concept underlying contextual recordation. These examples are not intended to limit the scope, but rather to serve as guidance. In this example, the process detects 503 or requests a current vehicle location. This could be a pure set of GPS coordinates, or could correlate to a know or user-defined POI. For example, if the request came within a perimeter around a user's home location, the process could choose to record the context as "home" as opposed to the specific location. Locality may be more useful than location when determining context, as it is highly unlikely that the user will actually request an application in the exact same location twice, unless the vehicle is stopped at a defined point (e.g., a garage location or driveway location). Accordingly, when location is used as a context, the process may associate a location range (+/−x meters in any direction) with a locality request. This can be used to build a contextual region (locality) that would apply as the location-context for an application, under such an example.

The process may also observe/determine a day of week 507 or time of day 505. With regards to time of day, like location, a concept of a range as opposed to a specific time may be more useful. If the process is tracking time of day, it may use a range (+/−X minutes) to register the time for context purposes. The specificity of any range may be user-adjustable or OEM adjustable. In other examples, the process may self-tune the ranges depending on how much context is appearing. That is, with limited data available, the process may use wider ranges in an attempt to "guess" correctly, but as more data becomes available the ranges may be narrowed for any particular context or context instance to more accurately reflect the actual observations. For example, if a user used an application at 11 AM, 11:20 AM and 11:35 AM, the process may associate the context as 10:40-11:55 AM (+/−20 minutes to the actual observations). But if 100 data points were available, the process may define the range based on the outliers +/−5 minutes or use a normalized distribution with a standard deviation. Other methods of refining context can also be used, and this may help prevent outlying data from overly expanding a context definition.

The process may further determine 509 other context as appropriate. For example, the context could be "weather." With limited data points, the process could use a vague definition of weather, in the same manner of the broad range with the location or time. That is, if the application was used once during light rain and once during heavy rain, the process could define the context as precipitation. But if the application was used still once during light rain and sixty times during heavy rain, the context may be changed to "heavy rain" or "storm" (since the light rain appears to be an outlier). Other correlations could also be observed, such as a user who uses a golf application whenever there is less than a 30% chance of rain over the next four hours. Of course, it may require significant usage from the user to observe such a correlation, which is where the concept of allowing users to dictate the variables considered for context may be useful. That is, if a user's decisions are frequently predicated on the weather (boating, picnicking, taking a child to a park, fishing, golfing, etc) the user may want a detailed analysis of weather associated with contextual analysis. On the other hand, a user who largely travels to work and home, with little outdoor activity, may not want weather related variables to be considered at all, because they may have no actual correlation to application usage, even if a correlation appears to exist. Essentially, this allows users to tailor context to their lifestyle, without having to wait for a process to draw the eventual correlations.

It is also worth noting that a context-tracking application could be installed on a mobile device, to track the context of applications requested on the mobile device, when those applications also exist in a vehicle. That is, if a golf application exists both on a mobile device and in a vehicle, the process may be able to gather more data faster if the tracking application can gather and report context data for the application that occurs in both places. Also, if the tracking data was gathered for all applications on a mobile device, and simply stored until needed, then the user could have an immediate set of context related to a previously device-only application if that application were subsequently installed in a vehicle for use. Or, in other examples, the vehicle may simply pull and present the entire (or a permitted subset) of applications from the mobile device, making most or all applications on a mobile device effectively "vehicle" applications as well.

Once the relevant context variables have been observed, the process may save 511 the context with respect to the application. In some examples, every defined context variable may be tracked for every application, but the process may not consider all the variables at a given time. If there is limited distinction available from certain variables, or if a user has instructed the process not to consider certain variables, then the context related to those variables may not be considered. On the other hand, if the user later decides to use those variables, or if the context data accrues to a useful point, that aspect of context could then be enabled for the application, without having to build an entire data set from scratch. n certain embodiments, applications designed specifically for a particular vehicle or line may be included in a first display screen when a user is in that type or line of vehicles, because in that instance the "context" includes being present in the designated vehicle or line of vehicles.

Figure 6:
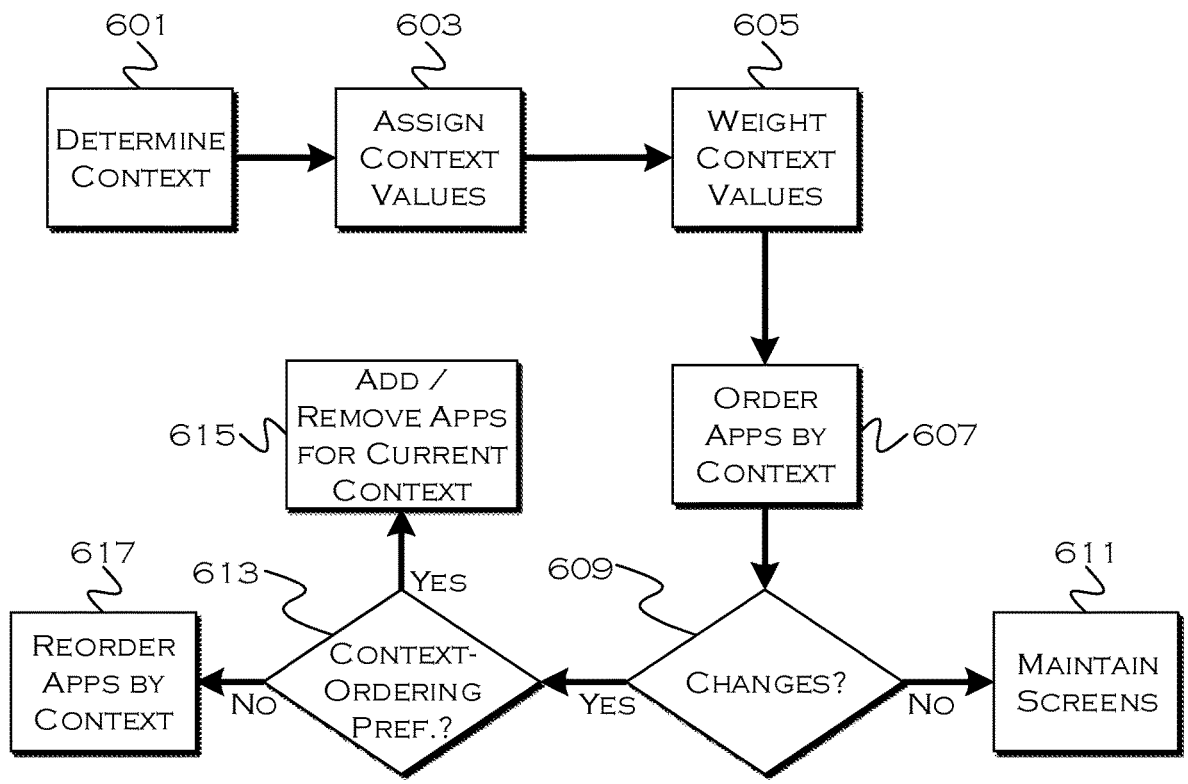
FIG. 6 shows an illustrative process for application presentation based on context.

FIG. 6 shows an illustrative process for application presentation based on context. In this example, the process determines 601 a current context. This can include a context related to enabled or user-defined context variables of relevance, or the context could be "all context variables" that the system has been configured to consider (even if some do not apply to any present applications). Based on the occurrence of the contexts, the process can then assign 603 context values to each application if a correlation between an application-saved context and a present context exists.

For example, Application A may have context [location=within 2 miles of food; time of day=11 AM-1 PM; road-type=surface road; passengers=<3] and Application B may have context [location =within 5 miles of office; time of day=4-6 PM; day of week=Mon, Tues; weather=no precipitation; passengers=1]. In this scenario, it is noon on Wednesday, there are two people in the vehicle traveling on a highway, within 5 miles of the office location and within 2 miles of a restaurant, the weather is clear. Accordingly, Application A has 3 context matches (location, time, passengers) and Application B has 2 context matches (location and weather). If everything else were treated equally, this could be used to prioritize Application A over Application B.

The process may also weight 605 context values, however, which could be done based on a user defined schema, a total usage amount (higher usage =higher weighting), confidence (number of data points), etc. So, in the preceding example, the process may determine that Application B has been used 60 times and Application A has only been used 4 times. Based on the higher confidence in the B related data and the high usage rate, this could cause the presentation of Application B to supersede A. A manufacturer may also define a weighting schema to be used unless a user defines a weighting schema.

In another example, the user may be a person of habit, so the user may prefer to give time of day triple the weight of all other context. In this example, the scores would then shift to 5 for Application A and remain at 2 for Application B. The various weights and affects associated therewith can be varied to fine-tune a system that most accurately predicts what result a user would prefer. Weights may also be varied, for example, by observing when a "guess" is wrong (e.g., Application A is presented and the user stops, changes screens and selects B). This would initially indicate that "something" caused the shift towards B, and, if the preceding example were repeatedly observed, then "weather" (the distinguishing factor) may be given greater weight over time.

After assigning and weighting context values (if desired), the process can order 607 the applications by correlation to present context. If this ordering results in changes 609 to a set of already presented applications, the process can determine 613 if context-ordering is preferred for some or all of a permissible set of menus. It may be the case that the menu is presented, for example, based solely on overall usage, but a "context" button allows some or all of the menu to shift to a context menu instead (and a "usage" button could allow a shift back). If context ordering is preferred for at least a portion of the displayed screen(s), the process can reorder 617 the applications occupying those slots by context. If the screen is a blend of "most used" and "context relevant" applications, the process can also remove redundancies (applications appearing in both) to include a next-best application instead. If context ordering is not currently preferred, the process can add/remove 615 applications from a memory-stored ordering for the current context, allowing a quick shift to the stored ordering without having to perform the whole context inquiry (unless the context meaningfully changes). If the context ordering and the usage ordering are the same (or if any new context has not impacted ordering), the process can leave 611 the current menu set as it is already being presented.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
determine a set of context-variable values, wherein the values are detectable by a vehicle, responsive to a restriction imposition resulting in a limited-display capability for displaying selectable application icons, and wherein the context-variables include at least one variable different from a variable corresponding to a reason for the restriction imposition;
determine whether a correlation exists between the context-variable values and context states saved for each of a plurality of applications displayable as selectable application icons, the context states defining context variable values previously present when a respective application was used and the correlation based on whether at least one context state for a given application matches a context-variable value wherein the context states are states that were saved, with respect to the respective application that was previously used, based on observation of a past context variable value that existed when the respective application was used at a past time, and wherein a plurality of states is saved for at least one context variable associated with the respective application;
defining a weighted value associated with each application based on correlation to determined context-variable values, wherein applications with more correlation to current context-variable values are weighted higher than applications with less correlation; and
display, up to a maximum number of displayable icons permitted by the restriction imposition, a predefined number of the plurality of selectable application icons corresponding to the applications having highest weightings with the plurality of selectable icons.

2. The system of claim 1, wherein the restriction imposition results from a vehicle speed.

3. The system of claim 1, wherein the restriction imposition results from a determined driver-distraction level.

4. The system of claim 1, wherein the processor is configured to weight the correlations based on a user-defined weighting for one or more of the context variables.

5. The system of claim 1, wherein the processor is further configured to:
present a selectable button for switching a display between context-based application ordering and over-all-usage based application ordering; and
switch a display between the predefined number of the plurality of selectable application icons and the predefined number of overall-usage based selectable application icons, corresponding to the applications a user uses most frequently, responsive to selection of the button.

6. The system of claim 1, wherein the predefined number is a predefined subset less than a total number of displayable selectable application icons permissible as defined by the restriction, wherein a remainder of the total number of displayable selectable application icons are displayed based on observed overall usage, wherein the icons displayed based on observed overall usage are different from icons displayed as part of the subset.

7. The system of claim 1, wherein the determined context-variable values include a current location value.

8. The system of claim 1, wherein the determined context-variable values include a current weather state.

9. The system of claim 1, wherein the determined context-variable values include a current road type.

10. The system of claim 1, wherein the determined context-variable values include a current time of day.

11. The system of claim 1, wherein the determined context-variable values include a current day of week.

12. The system of claim 1, wherein the determined context-variable values include a current proximity to a known point of interest.

13. The system of claim 1, wherein the determined context-variable values include a current vehicle speed.

14. The system of claim 1, wherein the determined context-variable values include a current number of passengers.

15. The system of claim 1, wherein the determined context-variable values considered for determining the correlation of a given application are chosen based on contexts designated by a user as being contexts to be considered when evaluating the suitability of the given application for display.

* * * * *